Jan. 19, 1971  W. E. HOWALD ET AL  3,556,675
TURBOMACHINERY ROTOR WITH INTEGRAL SHROUD
Filed Jan. 29, 1969  2 Sheets-Sheet 1
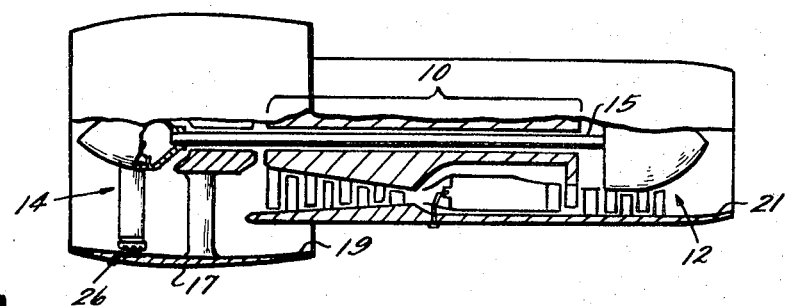
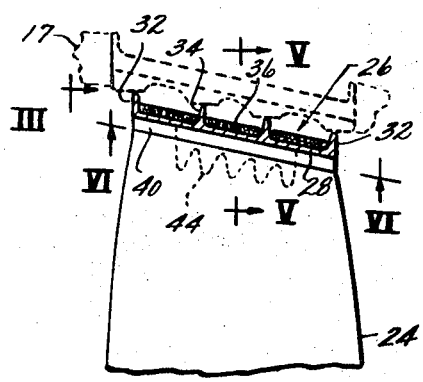
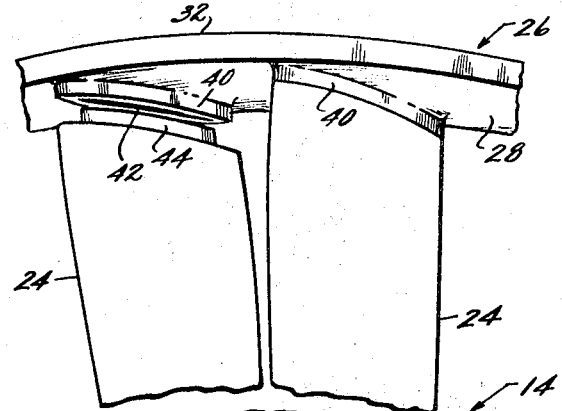
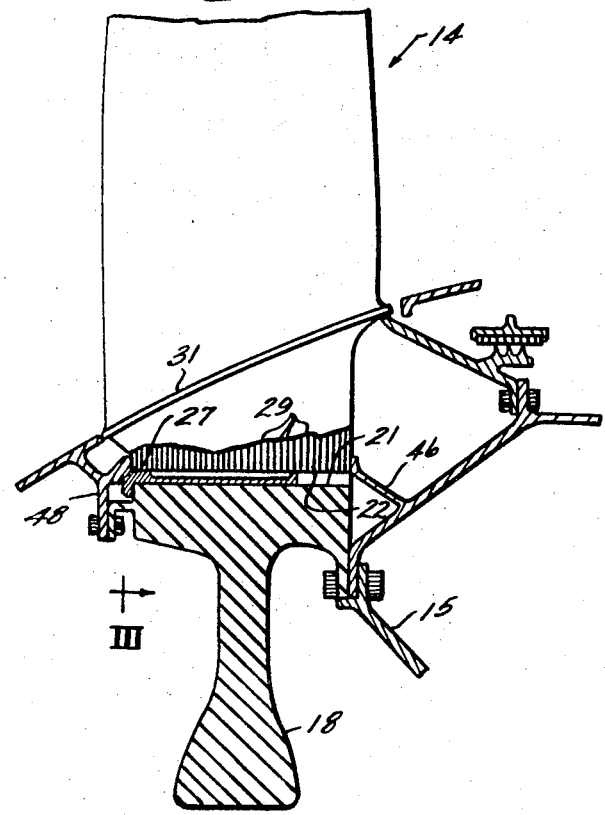
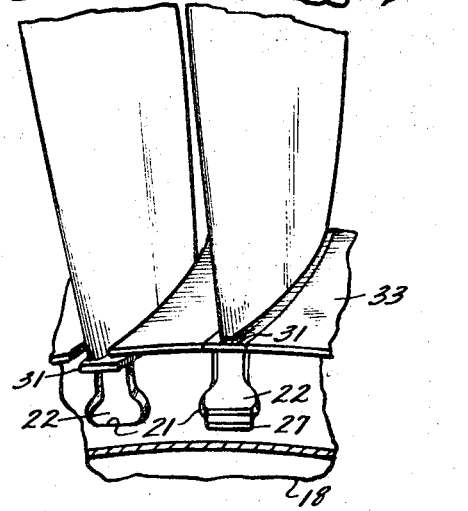
INVENTORS.
WERNER E. HOWALD
MAX. W. STANLEY
ATTORNEY

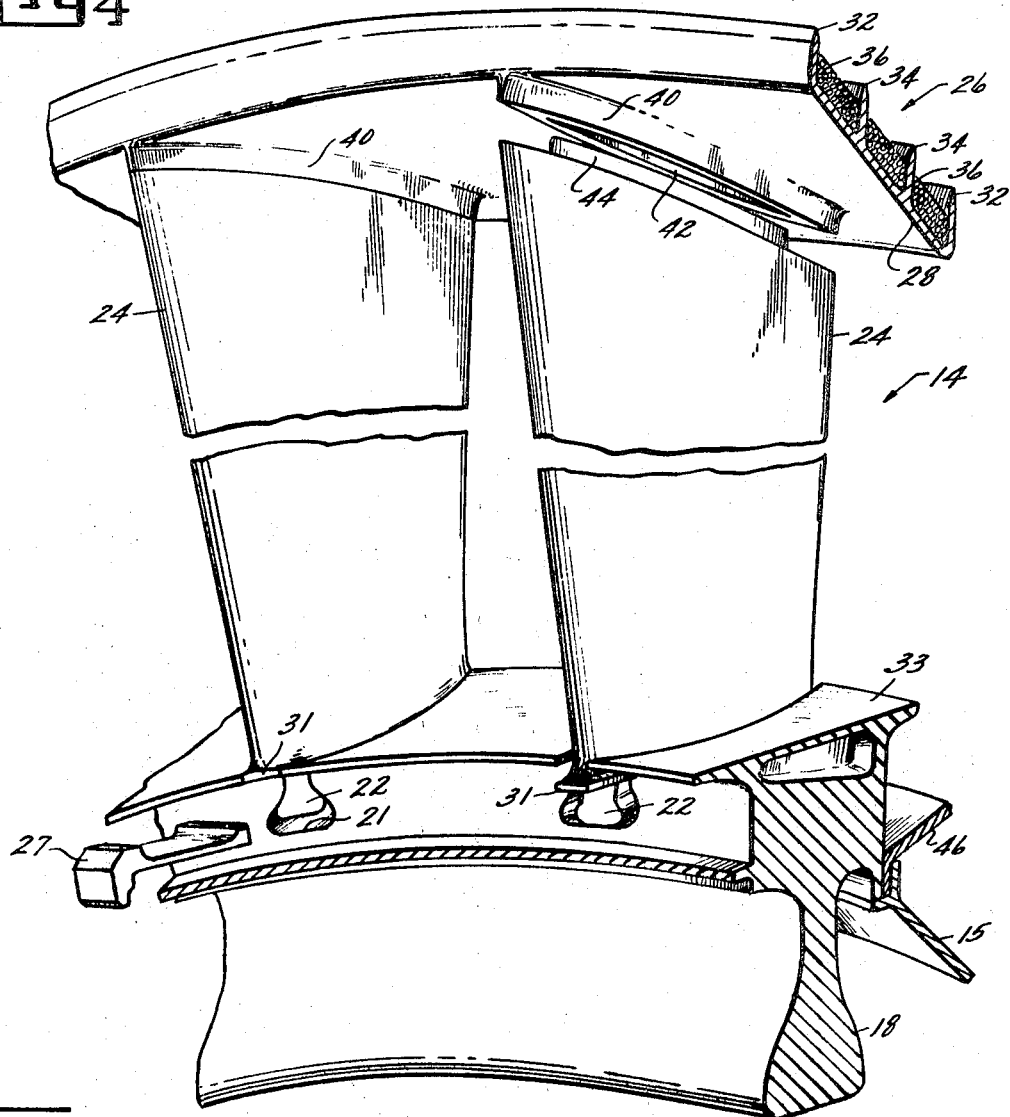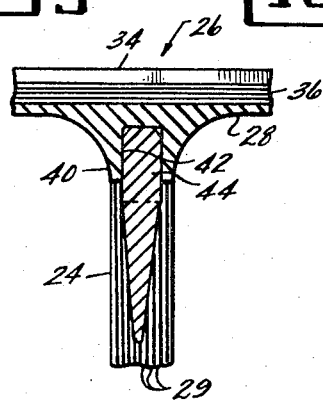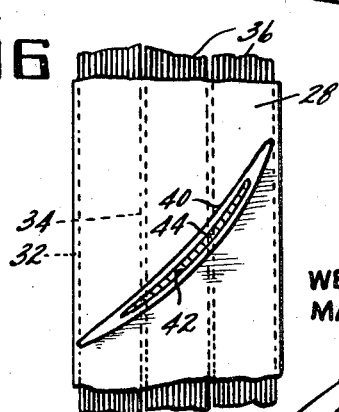

United States Patent Office 3,556,675
Patented Jan. 19, 1971

3,556,675
TURBOMACHINERY ROTOR WITH INTEGRAL SHROUD
Werner E. Howald, Cincinnati, and Max W. Stanley, Fairfield, Ohio, assignors to General Electric Company, a corporation of New York
Filed Jan. 29, 1969, Ser. No. 794,860
Int. Cl. F01d 5/24
U.S. Cl. 416—190    2 Claims

ABSTRACT OF THE DISCLOSURE

A fan rotor is shown and comprises composite material and blades mounted by tangs on a disc. The outer ends of the blades are received by sockets in a tip shroud in the form of a hoop. The hoop comprises an inner band of homogeneous material about which is a wound filament band of composite material. Upon removal of retainers at the inner ends of the tangs, individual blades may be shifted radially inwardly for removal from the rotor.

---

The present invention relates to improvements in turbomachinery and, in particular, to bladed rotors thereof.

It has long been recognized that the blades of compressor and turbine rotors have natural frequencies of vibration and that cyclic pressure perturbations in the fluid streams flowing through the blades can and do occur at these frequencies. Of particular significance are torsional modes of vibration. Where blade vibration is excited by cyclic fluid pressure perturbations for even a relatively short period of time, self-destruction of a blade can result and cause loss of output from the turbine or compressor.

Many factors affect the natural vibration frequency of a given design, one of the most predominant being its aspect ratio, i.e., the ratio of the blade length to the length of the chord of the cambered airfoil blade. In general, it may be said that the higher the aspect ratio, the lower the natural frequency.

In many instances aerodynamic design constructions enable a relatively low aspect ratio to be used to that the natural frequency of the blades is high enough to prevent excitation by pressure perturbations in the fluid flow through the blade row.

However, aerodynamic considerations or practical considerations, such as weight, may prevent the use of sufficiently low aspect ratios to avoid the natural vibration problem. The latter case is particularly true in connection with larger diameter, low pressure compressors employed in the propulsion of aircraft and commonly referred to as "fans."

Where it has been necessary to use blades having high aspect rations, it has been a common practice to provide part-span shrouds or tip shrouds. Such shrouds take the form of plates projecting laterally from opposite surfaces of the blades. These shrouds can increase the natural frequency of the blades and further contact each other to limit or restrain the magnitude of the vibration induced therein as well as providing a damping action which limits excitation of blade vibration.

Conventionally the projecting plates forming such shrouds are carried by the blades from which they project. This increases the weight of each blade and, likewise, increases the radial forces which must be carried by the rotor on which the blades are mounted. The increased forced loadings on the rotor, in turn, require an increased mass of metal in order to have sufficient rotor strength. The net result represents a significant weight increase for the turbine or compressor rotors. This translates into a severe weight penalty which is of particular significance for gas turbine engines or fans employed in the propulsion of aircraft. In fact, it can be noted that part-span shrouds are employed to minimize these weight penalties, even though they cause aerodynamic losses as fluid flows through the bladed row.

The vibrational problems discussed above are generally applicable to all turbomachinery blades. They pose even greater problems where turbomachinery blades are formed of composite materials, having particular reference to composite materials of the type comprising high strength filaments, as for example, boron or graphite filaments imbedded in a homogeneous matrix, such as aluminum or a plastic resin. Such composite material blades are even more prone to having an undesirably low frequency of vibration due to the fact that their torsional moduli of elasticity are relatively low, it being noted that the natural frequency of vibration is directly proportional, in the torsional mode, to the square root of the torsional modulus of elasticity. A further problem with such composite blades is that the unidirectional strength characteristics of the filament makes it impractical, if not impossible, to provide conventional integral shrouds, either at the tip or at part-span, to overcome the vibrational problems in the fashion done with homogeneous metal blades.

These limitations have prevented full utilization of composite materials in large diameter fans where the weight-saving benefits would be most beneficial.

One of the objects of the invention is to minimize, if not essentially eliminate, destructive blade vibration problems in turbomachinery rotors.

Another object of the invention is to make practical utilization of rotor blades having a high aspect ratio.

Another object of the invention is to accomplish the above ends, particularly to enable utilization of blades formed of composite materials, and thereby take maximum advantage of the weight-saving potential of large diameter fan rotors having composite material blades.

The above ends are attained by a turbomachinery rotor comprising an outer shroud in the form of an integral hoop, a central disc mountable for rotation about a given axis. A plurality of blades project from the center disc and have their inner ends secured thereto. The shroud has inwardly facing socket means for receiving the outer end portions of the blades and positioning the shroud concentrically of the disc as well as locking the shroud for rotation with the disc. Means are provided for locking the blades in a radially outwardly position in which the outer ends are received by the socket means. These locking means are removable to permit individual blades to be displaced radially inwardly free of the socket means for removal from the engine. This arrangement also facilitates assembly of the rotor.

In a preferred form of the invention the outer shroud is compositely formed by a homogeneous metal band in which the socket means are formed. The shroud further comprises a composite hoop wound round the outer surface of the metal band, said composite hoop comprising a high strength, wound filament imbedded in a matrix. Another preferred feature of the invention is in such a rotor where the blades are formed of composite material comprising high strength filaments imbedded in a matrix and the outer end portions of each blade have bonded therein a projecting metal tip received by the socket means in the hoop.

The above and other related objects and features of the invention will be apparent from a reading of the following description of the disclosure found in the accompanying drawing and the novelty thereof pointed out in the appended claims.

In the drawing:

FIG. 1 is a simplified showing of a turbofan engine;

FIG. 2 is a view in longitudinal section illustrating the fan of FIG. 1 as it embodies the present invention;

FIG. 3 is a section taken on line III—III in FIG. 2, illustrating partial disassembly of the fan rotor;

FIG. 4 is a fragmentary perspective view of the fan rotor;

FIG. 5 is a section, on an enlarged scale, taken on line V—V in FIG. 2; and

FIG. 6 is a section taken on line VI—VI in FIG. 2.

The turbofan engine seen in FIG. 1 comprises a core engine 10 for generating a hot gas stream which drives a low pressure or fan turbine 12. This turbine is connected by a shaft 15 to a fan rotor 14. The fan rotor pressurizes air in a cowl 17. The outer portion of the pressurized air stream is discharged from an annular propulsive nozzle 19 defined, in part, by the downstream end of the cowl 19. The inner portion of this pressurized air stream is discharged into the core engine where it is further pressurized to support combustion of fuel in the generation of the referenced hot gas stream. The hot gas stream, after driving the fan turbine, is discharged through a nozzle 21 to provide further propulsive force.

Bladed fan rotors of the type employed in such turbofan engines have attained relatively large diameters and high peripheral tip speeds in order to take full advantage of the potentialities of the turbofan cycle, particularly towards the end of obtaining high bypass ratios wherein upwards of 85% of the propulsive force is provided by the fan stream discharge through a propulsive nozzle.

The rotor now to be described with reference to FIGS. 2-5 is particularly suited to such large diameters and operation at high peripheral tip speeds.

The rotor 14 comprises a disc 18 which is connected to the shaft 15 and driven thereby. The disc has lengthwise dovetail slots 21 formed across its outer periphery which receive tangs 22 at the inner ends of blades 24. The blades project radially outwardly to a shroud 26 and are held in locked position by retainers 27 as will be more fully described.

Advantageously, the blades 24 are formed of composite material, preferably comprising radially disposed high strength filaments 29 (greatly exaggerated in size in FIG. 5) imbedded in a suitable matrix. The platforms 31, defining the inner bounds of flow through the rotor, are formed integrally with the disc 18. A rib 33 is formed on opposite sides of the blades 24 to provide a faired surface and give protection to the blade filament against crushing loads at their juncture with the platforms 33.

The shroud 26 comprises a metal band 28 having outwardly projecting radial flanges 32 at its opposite ends as well as outwardly projecting flanges 34 intermediate the end flanges 32. The flanges 32, 34 function as labyrinth sealing teeth in cooperation with a sealing surface provided on the interior of the cowl 17 within which the air stream is pressurized by the fan.

Between the flanges 32, 34 are wound-filament, composite hoops 36. These hoops may have extremely high strengths when formed from the known class of materials comprising boron and graphite filaments (greatly exaggerated in diameter in the drawings) having tensile strengths in the order of 250,000–400,000 p.s.i. or higher. These filaments are imbedded in known fashion in a suitable matrix, as for example, epoxy resin or aluminum.

Integral faired lugs 40 project inwardly from the inner surface of the shroud band 28 and have an outline matching that of the tip ends of the cambered airfoil blades 24. The lugs have recesses 42 having an outline generally conforming to that of the tip ends of the blades but of lesser dimension. The tip ends of the blades have projections 44 corresponding in outline to that of the recesses 42 and are locked in the socket described. The projections 44 are preferably metal inserts bonded in the tip ends of the composite material blades.

As previously referenced, retainers 27, positioned between the tangs 22 and the bottom surface of the grooves 21, position the blades in a radial sense. An annular ring 46, secured to the disc 18 by the same bolts which connect it to the shaft 15, prevent rearward displacement of the blades 24. A second ring 48 is secured to the disc 18 and prevents forward displacement of the blades and also bears against the heads of retainers 27 to lock them in place.

The described rotor construction provides the desired vibration damping function by reason of the socket connected between the shroud 26 and the outer ends of the blades 24. This connection not only dampens the blades but substantially increases their natural frequency by giving the blades support at both ends, as opposed to the cantilevered mounting of the usual rotor blade. In this fashion long plastic blades having relative high aspect ratios become practical.

Another feature of the present invention is that the described shroud imposes no force loadings on the rotor. In other words, centrifugal force loadings are taken in the shroud itself. The composite construction of the shroud makes practical extremely high peripheral speeds. Preferably the blades 24, as well as the disc 18 and shroud 26, are dimensioned so that their outer ends are contiguous with the bosses 40 under all operating conditions without imparting any substantial loadings on the shroud 26. Such dimensioning takes into account radial growth caused by temperature changes, dynamic loadings and other known factors.

The ability to disassemble individual blades is also provided by the described rotor. This is accomplished by removing the ring 48 to provide access to the retainers 27 which may be withdrawn, as indicated in FIGS. 3 and 4. Upon withdrawal of a retainer, an individual blade 24 may be shifted radially inwardly so that its tip end is clear of its shroud socket. Once clear of the socket the blade may be shifted forwardly out of the groove 21. A new blade may be inserted in similar fashion. The same procedures would also be employed in originally assembling the described rotor.

While reference has been made herein to fan rotors, the invention in certain aspects has equal applicability to all axial flow compressor and turbine rotors. Likewise, while reference has been made to the unique advantages of composite materials, other aspects of the invention are not limited to their use. For these reasons the scope of the invention concepts is to be derived solely from the appended claims.

Having thus described the invention, what is claimed as novel and desired to be secured by Letters Patent of the United States is:

1. A turbomachinery rotor comprising
   an outer shroud including an inner metal band and composite hoop means formed by a high strength filament wound around the outer surface and imbedded in a matrix,
   a central disc,
   a plurality of blades projecting radially from said disc, said blades being formed of composite material including high strength, radially disposed filaments imbedded in a matrix,
   means for securing the inner ends of the blades in fixed position on said disc, and
   socket means cooperative between said shroud and the outer end portions of the blades for positioning the shroud concentrically of said disc, and locking said shroud for rotation with said disc, said socket means being characterized by a metal tip bonded to the end portion of each blade and radially slidable with respect to the shroud.

2. A turbomachinery rotor as in claim 1 wherein
   the socket means is further characterized by faired bosses integrally formed on the inner surface of said shroud, said bosses having an outline corresponding to the outline of the outer end portion of the blades and a recess within said outline and further each metal tip extends radially with each respective blade and projects outwardly into the respective recess.

References Cited

UNITED STATES PATENTS

| | | | |
|---|---|---|---|
| 2,971,745 | 2/1961 | Warren et al. | 253—77(S-1) |
| 3,053,505 | 9/1962 | Welsh | 253—77(S-1) |
| 3,070,350 | 12/1962 | Stewart | 253—77(S-1) |
| 3,095,138 | 6/1963 | Warnken | 253—77(S-1)(4) |
| 3,216,699 | 11/1965 | Schoenborn | 416—190(UX) |
| 3,442,442 | 5/1969 | Seiwert | 253—77(MP)(X) |

EVERETTE A. POWELL, JR., Primary Examiner

U.S. Cl. X.R.

416—195, 230